United States Patent

[11] 3,579,145

[72] Inventor Owen E. De Lange
Rumson, N.J.
[21] Appl. No. 809,261
[22] Filed Mar. 21, 1969
[45] Patented May 18, 1971
[73] Assignee Bell Telephone Laboratories, Incorporated
Murray Hill, Berkeley Heights, N.J.

[54] MODULATOR STABILIZATION CIRCUITS
3 Claims, 6 Drawing Figs.
[52] U.S. Cl. .................................................. 332/7.51,
250/199, 332/19, 332/38
[51] Int. Cl. .................................................. H01s 3/10,
H03c 1/06
[50] Field of Search .................................................. 332/7.51,
38, 19; 250/199; 331/94.5

[56] References Cited
UNITED STATES PATENTS
| | | | |
|---|---|---|---|
| 2,288,817 | 7/1942 | Maggio...................... | 332/38 |
| 3,213,367 | 10/1965 | Ravenscroft................ | 332/19X |
| 3,395,367 | 7/1968 | Bell et al..................... | 331/94.5 |

Primary Examiner—Rodney D. Bennett, Jr.
Assistant Examiner—Daniel C. Kaufman
Attorneys—R. J. Guenther and Arthur J. Torsiglieri ABSTRACT: The operating point of a modulator is stabilized by superimposing a pilot signal upon the information bearing modulating signal. The resulting modulation produced by the pilot signal is compared with a reference signal in a phase detector and a control signal generated which is used to counteract any drift of the operating point. Alternatively, the average intensity of the modulator output signal is detected and used to alter the net bias applied to the modulator as a means of stabilization.

PATENTED MAY 18 1971

INVENTOR
O. E. DE LANGE
BY
*Sylvan Sherman*
ATTORNEY

MODULATOR STABILIZATION CIRCUITS

This invention relates to optical beam modulators and, more particularly, to arrangements for stabilizing the operating point of such devices.

BACKGROUND OF THE INVENTION

Devices most commonly used to produce wideband amplitude modulation of an optical beam typically employ an electro-optic material disposed between a polarizer and a polarization analyzer. In these modulators, the incident beam is resolved into two orthogonal components which propagate through the electro-optic material with different phase velocities. The two components recombine at the output of the material to form a beam whose direction of polarization depends upon the differential phase delay experienced by the two components. Experience has shown that changes in temperature produce changes in the length of the electro-optic material and in its index of refraction. As a result, it is difficult to maintain the modulator at its preferred operating point. While accurate temperature control is one method of overcoming this difficulty, it is not a preferred technique.

SUMMARY OF THE INVENTION

In accordance with one aspect of the present invention, the operating point of an electromagnetic wave modulator is stabilized by superimposing a sinusoidal pilot signal upon the information bearing modulating signal, and observing the effect produced upon the pilot signal by the modulator. This is done by amplitude detecting a sample of the modulated output signal and comparing the detected signal in a phase detector with a reference signal derived from the pilot signal generator. The signal produced by the phase detector, as a result of this comparison, is then fed back to the modulator as a bias correction signal in a manner to minimize any tendency of the operating point to drift away from the preferred operating point.

In a pulse code modulation (PCM) embodiment, biased at a minimum point along the modulator output wave intensity versus bias characteristic, the modulator doubles the pilot signal frequency. When compared in the phase detector with a reference signal at the pilot signal fundamental frequency, no correction signal is produced. If, however, the operating point drifts, a component at the fundamental frequency of the pilot signal is detected in the modulator output, resulting in the generation of a correction signal by the phase detector. Since the phase of the detected pilot signal experiences a 180 degree phase reversal as a function of the direction in which the operating point drifts, the correction signal has one polarity due to drift in one direction, and an opposite polarity for drift in the opposite direction.

A similar arrangement is employed when the modulator is biased to operate over its linear region. In this latter case, any tendency on the part of the operating point to drift out of the linear region produces a second harmonic component of the pilot signal in the modulator output. Accordingly, a second harmonic of the pilot signal is used as the reference signal in the phase detector.

In accordance with a second aspect of the invention, the average intensity of the output wave, derived from a modulator biased to operate over its linear region, is detected. Changes on the average output intensity are sensed and a correction signal generated which minimizes the tendency of the modulator to drift away from the preferred operating point.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
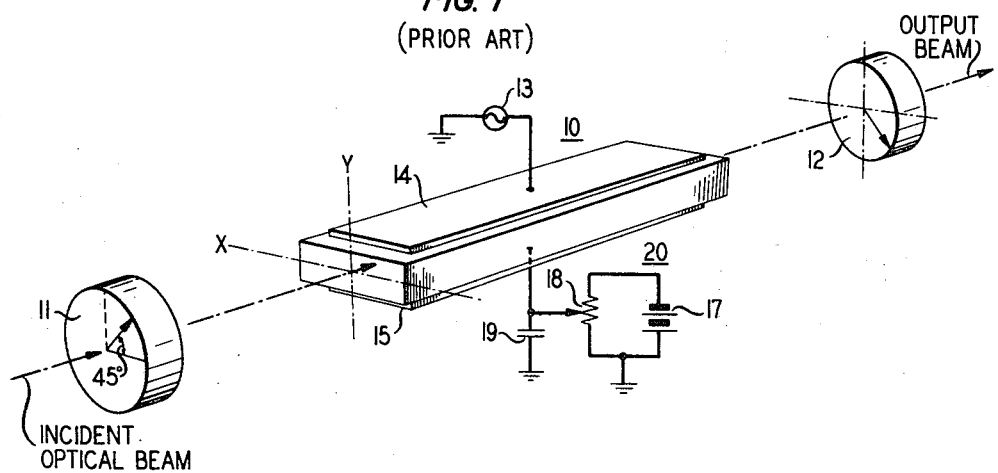
FIG. 1 shows a typical prior art optical beam modulator.

Referring to the drawings, FIG. 1 shows a typical prior art optical beam modulator comprising a phase modulator 10 disposed between a polarizer 11 and an analyzer 12. The phase modulator typically comprises a block of an electro-optic material, such as potassium-dihydrogen phosphate (KDP) or lithium niobate ($LINbO_3$), oriented with its optical axis perpendicular to the direction of beam propagation. An information bearing modulating signal, derived from a suitable signal source 13, is impressed across the electro-optic material in a direction transverse to the direction of beam propagation by means of a pair of electrodes 14 and 15 located on opposite sides thereof. A DC bias circuit 20, comprising a direct current source 17, a potentiometer 18 and a bypass capacitor 19, is connected between electrode 15 and ground.

In operation, the operating point of the modulator is established by adjusting potentiometer 18 of bias circuit 20. The incident optical beam is polarized, by the action of polarizer 11, at a 45 degree angle with respect to a pair of mutually perpendicular transverse axes. For purposes of illustration, these are identified in FIG. 1 as the $x$ and $y$ axes. The beam can then be considered in terms of two orthogonal components, polarized parallel to the $x$ and $y$ axes. Since the phase velocities along these two directions are different, the relative phase of the two components changes as they traverse the electro-optic material. As a result, the polarization of the beam at the output of the block is rotated an amount which depends upon the refractive indices along the $x$ and $y$ directions and the length of the block.

The rotated beam then enters analyzer 12, which passes that component of the beam that is parallel to the direction of polarization of the analyzer.

As is evident, the intensity of the output beam depends upon the relative polarizations of the beam, as it leaves the electro-optic material, and the analyzer. The former, in turn, depends upon the instantaneous voltage applied to the electro-optic material.

Figure 2:
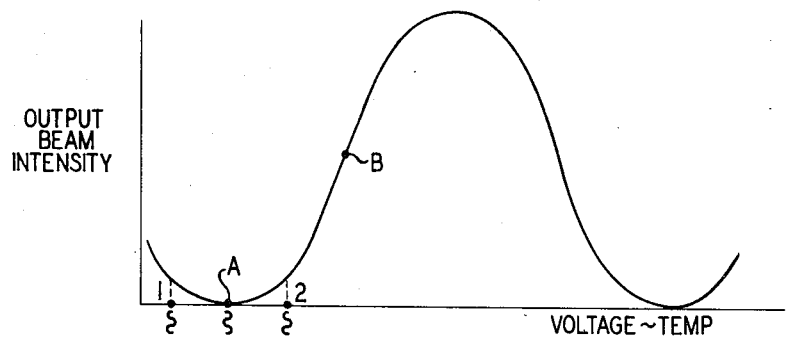
FIG. 2 included for purposes of explanation, shows the variation in the output beam intensity of the modulator of FIG. 1 as a function of voltage and temperature.

FIG. 2 shows the manner in which the output beam intensity varies as a function of the voltage impressed across the phase modulator. It is also illustrative of the effect of temperature upon the output beam intensity. Because of this temperature dependency, maintaining the modulator as a particular operating point requires either that the electro-optic material be carefully maintained at a constant temperature, or that, alternatively, some means of sensing any drift in the operating point be provided and the drift corrected. The present invention relates to techniques for sensing this drift and for correcting it.

Figure 3:
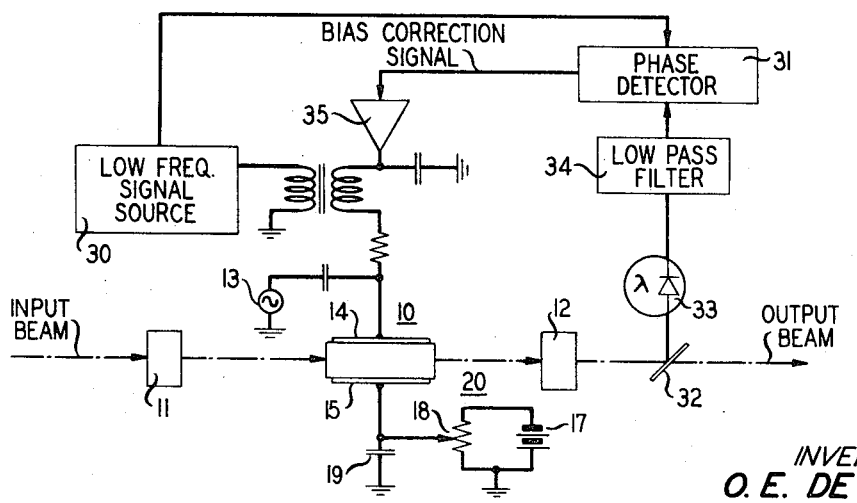
FIG. 3 shows a first embodiment of an operating point stabilizing circuit, in accordance with the invention, intended for pulse code modulation operation.

Basically, there are two modes of operation. The first mode to be considered involves pulse code modulation (PCM) in which the output is either a mark (on) or a space (off). In this mode of operation, the modulator is biased at a minimum point in the output wave intensity characteristic for which the beam intensity is zero in the absence of a modulating signal. In the presence of a signal, the operating point is shifted away from the minimum point and a pulse of light is produced. A change in temperature, however, will also shift the operating point and produce an output. To avoid this, the operating point is stabilized, in accordance with the invention, as shown in FIG. 3. For ease of identification, the same identification numerals are used in FIG. 3 as were used in FIG. 1 to identify corresponding components of the modulator. Thus, in FIG. 3, the modulator proper includes a phase modulator 10, comprising a block of electro-optic material disposed between a polarizer 11 and an analyzer 12. A modulating signal, derived from signal source 13, is impressed across the electro-optic material by means of electrodes 14 and 15.

In order to sense any drift in the operating point away from the preferred operating point A, established by bias circuit 20, a pilot signal, derived from a low frequency signal source 30, is superimposed upon the modulating signal. The pilot signal is small relative to the modulating signal and, advantageously, lies outside the frequency band of the modulating signal.

The pilot signal is also coupled to a phase detector 31 along with a detected component of the output beam. The latter is obtained by means of a beam splitter 32 which diverts a small fraction of the output beam to a photodetector 33. The output from detector 33 is filtered by means of a low pass filter 34, and then coupled to phase detector 31.

The output from detector 31 is amplified by means of an amplifier 35 and then coupled back to the modulator as the operating point correction signal.

The operation of the stabilizing circuit is based upon the recognition that when the operating point is at A, the phase detector output is zero. This is so since, as can be seen in FIG. 2, there is a frequency doubling effect at operating point A which converts the pilot signal frequency, $f_p$, to twice that frequency. When the latter signal is compared with the reference pilot signal in the phase detector, no output signal is produced thereby and hence, no correction signal is applied to the modulator.

As the operating point drifts away from the preferred operating point as, for example, to a point 1 below point A, a component at the fundamental pilot signal frequency appears in the output beam. This is detected and applied along with the reference pilot signal to the phase detector which produces a DC correction signal of a first polarity, thereby shifting the operating point from 1 back to A. A shift in the opposite direction, to point 2, will have the same effect with the one difference that the polarity of the resulting correction signal is reversed, causing a drift away from point 2 and back to point A.

Figure 4:
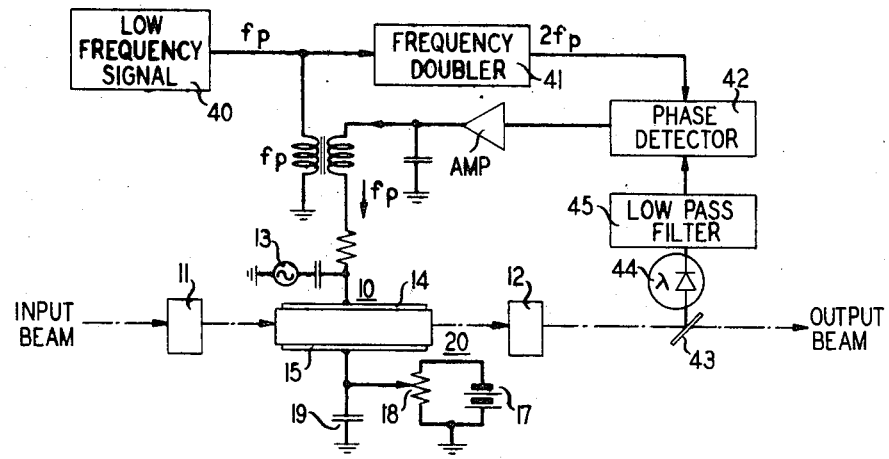
FIGS. 4 and 5 show two embodiments of the invention for stabilizing the operating point of a modulator in the linear region of its operating characteristic.
Figure 5:
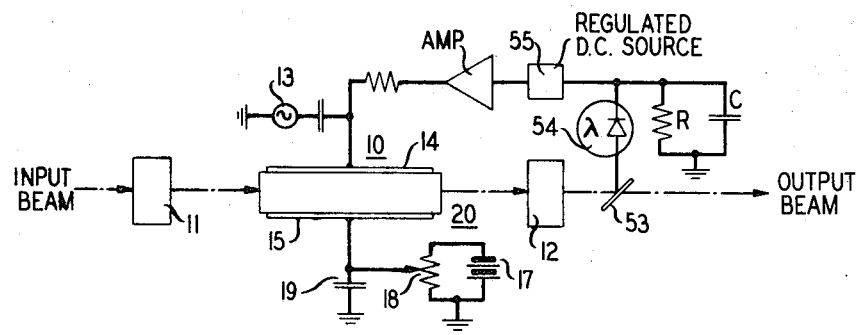

FIGS. 4 and 5 show two stabilization arrangements for use in the second, or linear mode of operation. In this mode, the operating point B is established by bias circuit 20 at the most linear region of the intensity-voltage characteristic curve. Thus, in each of these embodiments, it is the function of the stabilization circuit to maintain the modulator at operating point B in FIG. 2.

In the first of these embodiments, illustrated in FIG. 4, a pilot signal $f_p$, derived from a low frequency signal source 40, is applied to phase modulator 10 along with the modulating signal derived from the modulating signal source 13. A component of the pilot signal is also coupled to a frequency doubler 41 to produce a component at twice the pilot signal frequency. The output from doubler 41 is advantageously passed through a narrow band filter tuned to $2f_p$ and then to phase detector 42.

As in the embodiment of FIG. 3, a portion of the output beam is coupled, by means of a beam splitter 43, to a photodetector 44. The signal detected thereby is then coupled to phase detector 42 through a low pass filter 45. The output from detector 42 is coupled to electrode 14 of the phase modulator.

As indicated hereinabove, the preferred operating point B is located in the linear region of the modulator characteristic. As long as this condition prevails, the pilot signal is undistorted by the modulator and is recovered by photodetector 44. Since the reference signals applied to detector 42 has a frequency $2f_p$, whereas the detected signal has a frequency $f_p$, the phase detector output is zero and no correction signal is coupled back to the phase modulator.

If, on the other hand, the operating point tends to drift away from the preferred operating point and into the nonlinear region of the modulator characteristic, the pilot signal is distorted by the modulator and a second harmonic component of the pilot signal is produced. When the latter signal is coupled to the phase detector following photodetection, a correction signal is generated by the phase detector which, when applied to the modulator, shifts the operating point back towards the region of linear operation.

Since the phase of the second harmonic component generated by distortion in the modulator also depends upon the direction in which the operating point tends to drift, the stabilizing circuit senses both the drift and its direction, and produces a correction signal whose polarity and amplitude is a measure of the direction and magnitude of the drift.

In each of the two stabilizing circuits described hereinabove, a low frequency pilot signal is superimposed upon the modulating signal, and any drifting of the operating point is detected by observing the effect produced upon the pilot signal by the modulator. In the embodiment illustrated in FIG. 5, and now to be described, variations in the average intensity of the output beam are directly determined by comparing the detected average with a direct current reference voltage. The difference signal thus obtained is used at minimize any drifting of the operating point away from its preferred location at point B on the intensity-voltage curve. Accordingly, in the embodiment of FIG. 5, the stabilization circuit comprises a beam splitter 53, a photodetector 54 and a DC reference voltage source 55. Changes in the average beam intensity, due to changes in the operating point, are thereby detected and an appropriate correction signal generated.

In operation, the preferred operating bias is established by bias circuit 20. The amplitude and polarity of the reference voltage is then set such that it is equal and opposite to the voltage produced by photodetector 54. Being connected in series, the two cancel, thus producing no net correction voltage. Any tendency for the operating point to drift, however, changes the amplitude of the detected signal so that it is no longer equal to the DC reference voltage. This, in turn, produces a difference signal which tends to restore the correct operating point.

Figure 6:
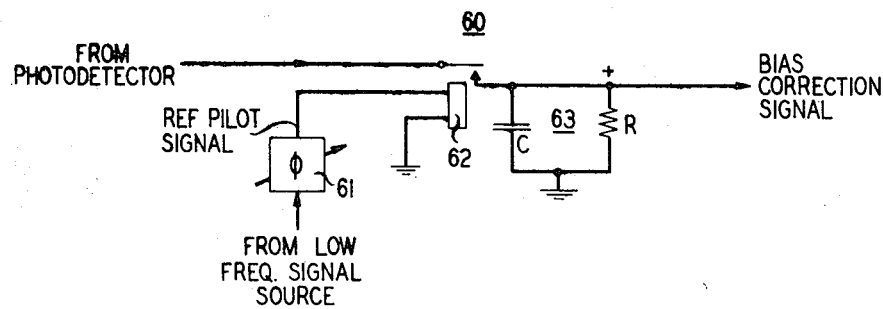
FIG. 6 shows an illustrative embodiment of a phase detector.

FIG. 6, included for purposes of illustration, shows one embodiment of a phase detector that can be employed in connection with the present invention. This particular embodiment comprises a polarized relay 60 having a single make contact. The reference pilot signal is connected through an adjustable phase shifter 61 to the relay coil 62. The detected signal is connected through the relay contacts to a parallel R-C circuit 63.

In operation, the signal from the low frequency signal source activates relay 60. However, since the latter is a polarized relay it only responds to signals of one polarity. Assuming, for purposes of explanation, that relay 60 responds only to signals of positive polarity, the relay contacts will close only during the positive half cycle of the reference signal. This means that the detected signal, derived from the modulator, is coupled to the R-C circuit during only half a cycle. By adjusting the relative phase of the detected pilot signal and the reference pilot signal by means of phase shifter 61, the relay can be made to close during either the positive or negative half cycles of the detected signal. Thus, a positive or a negative signal can be developed across the R-C circuit.

In the embodiment of FIG. 3, the detected signal is twice the frequency of the reference signal as long as the modulator operating point is at A. In this situation, the relay is activated at half the detected signal frequency, resulting in zero average voltage being developed across the R-C circuit. When the operating point drifts away from point A, a fundamental frequency component of the pilot signal is detected in the output beam. This fundamental component modifies the average value of the detected signal, producing a net voltage across R-C circuit 63.

Similarly, in the embodiment of FIG. 4, when the modulator operates at point B, there is no doubling of the pilot signal frequency, resulting in no net output voltage from the phase detector. As the modulator drifts into a nonlinear region, however, frequency doubling occurs, producing a net correction voltage across the R-C circuit.

The rapidity with which the stabilization circuit responds to changes in the operating point is controlled by varying the time constant of the R-C circuit.

For purposes of illustration and explanation, the modulator described in connection with FIGS. 3, 4 and 5 is shown as comprising an electro-optic material, and modulation is shown as being produced by impressing an electric field across the electro-optic material. It will be recognized, however, that other types of polarization rotators can just as readily be used to produce modulation. Examples of such other materials are the Faraday-effect materials described on page 596 of "Fundamentals of Optics," by F. A. Jenkins and H. E. White. In such alternative embodiments of a modulator, the operating point is defined by the magnitude of a constant magnetic biasing field impressed upon the Faraday-effect material, and modulation is produced by impressing a varying magnetic field upon the material. Stabilization, in accordance with the present invention, is obtained by controlling the magnetic bias applied to the material. That is, the correction signal derived from the phase detector is a current, applied to the modulator magnetizing coil, rather than a voltage applied to a pair of electrodes. Similarly, the phase detector disclosed in FIG. 6 is merely illustrative. Other types of such detectors as, for example, those illustrated in Vol. 21 of the MIT Radiation Laboratory Series, "Electronic Instruments," starting at page 383, can just as readily be used. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

I claim:

1. In combination:
   an optical wave amplitude modulator whose output wave intensity varies in response to an information bearing modulating signal;
   said modulator comprising an electro-optical material and means for impressing said modulating signal across said material in a direction transverse to the direction of optical wave propagation through said material;
   means for establishing a bias in said modulator, thereby defining a preferred operating point;
   and means for stabilizing the bias of said modulator at said preferred operating point comprising:
   a pilot signal generator;
   means for coupling said generator to said modulator to modulate the output wave intensity of said modulator;
   means coupled to the output of said modulator for detecting the modulation produced by said pilot signal;
   a phase detector;
   means for coupling the detected modulation produced by said pilot signal to said phase detector;
   means for coupling said pilot signal generator to said phase detector;
   and means for coupling the output from said phase detector to said modulator to stabilize the operation of said modulator about said preferred operating point.

2. In combination:
   an electromagnetic wave amplitude modulator whose output wave intensity varies in response to an information bearing modulating signal;
   means for biasing said modulator at a minimum point along its output wave intensity versus bias characteristic;
   and means for stabilizing the bias of said modulator at said minimum point comprising:
   a pilot signal generator;
   means for coupling said generator to said modulator to modulate the output wave intensity of said modulator;
   means coupled to the output of said modulator for detecting the modulation produced by said pilot signal;
   a phase detector;
   means for coupling the detected modulation produced by said pilot signal to said phase detector;
   means for coupling said pilot signal generator to said phase detector;
   and means for coupling the output from said phase detector to said modulator to stabilize the operation of said modulator about said minimum point.

3. In combination:
   an electromagnetic wave amplitude modulator whose output wave intensity varies in response to an information bearing modulating signal;
   means for biasing said modulator at a preferred operating point in the linear region of its output wave intensity versus bias characteristic;
   and means for stabilizing the bias of said modulator at said preferred operating point comprising:
   a pilot signal generator;
   means for coupling said generator to said modulator to modulate the output wave intensity of said modulator;
   means coupled to the output of said modulator for detecting the modulation produced by said pilot signal;
   a phase detector;
   means for coupling the detected modulation produced by said pilot signal to said phase detector;
   means including a frequency doubler for coupling said pilot signal generator to said phase detector;
   and means for coupling the output from said phase detector to said modulator to stabilize the operation of said modulator about said preferred operating point.